US008238619B2

(12) United States Patent  
Kim

(10) Patent No.: US 8,238,619 B2  
(45) Date of Patent: Aug. 7, 2012

(54) METHOD OF EXTRACTING RIDGE LINE AND VALLEY LINE FROM THREE-DIMENSIONAL POINT DATA

(75) Inventor: Soo-Kyun Kim, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 1295 days.

(21) Appl. No.: 11/986,122

(22) Filed: Nov. 20, 2007

(65) Prior Publication Data  
US 2008/0181469 A1 Jul. 31, 2008

(30) Foreign Application Priority Data  
Nov. 23, 2006 (KR) .................. 10-2006-0116361

(51) Int. Cl.  
G06K 9/00 (2006.01)

(52) U.S. Cl. ........................................ 382/124

(58) Field of Classification Search .......... 382/124–127, 382/154  
See application file for complete search history.

(56) References Cited

U.S. PATENT DOCUMENTS  
5,664,027 A * 9/1997 Ittner ............................ 382/170

FOREIGN PATENT DOCUMENTS  
JP  06-036013   2/1994  
JP  08-212334   8/1996  
JP  2004-362087  12/2004  
JP  2006-91909   4/2006

OTHER PUBLICATIONS

Soo-Kyun Kim, Finding ridges and valleys in a discrete surface using a modified MLS approximation, Jan. 2005, Computer Aid Design.*

* cited by examiner

Primary Examiner — Alex Liew  
(74) Attorney, Agent, or Firm — Cha & Reiter, LLC

(57) ABSTRACT

Disclosed is a method of extracting ridge and valley lines from three-dimensional point data, the method including the steps of: receiving undefined point data obtained from a three-dimensional scanning system; estimating a normal vector by principal component analysis so as to calculate a normal vector with regard to each received point; and on the basis of such information, creating a moving least squares (MLS) surface of points approximation with regard to each received point. Then, Delaunay edge is created by a Voronoi diagram with regard to each point from the created MLS surface of points; and ridge (or valley) points are extracted by measuring zero-crossing on each Delaunay edge. Ridges and valleys as lines are created by connecting the extracted ridge points in a principal curvature direction. The extraction of ridge and valley lines is used as a pre-processing step for creating three-dimensional points into mesh data, and is advantageous for identifying general model features.

9 Claims, 10 Drawing Sheets  
(5 of 10 Drawing Sheet(s) Filed in Color)

(A)  (B)

(A)

(B)

(C)

(D)

METHOD OF EXTRACTING RIDGE LINE AND VALLEY LINE FROM THREE-DIMENSIONAL POINT DATA

CLAIM OF PRIORITY

This application claims priority to application entitled "Method Of Extracting Ridge Line And Valley Line From Three-Dimensional Point Data," filed with the Korean Intellectual Property Office on Nov. 23, 2006 and assigned Serial No. 2006-116361, the entire contents of which are incorporated herein by reference.

BACKGROUND OF THE INVENTION

1. Field of the Invention

The present invention relates to a method of extracting ridge and valley lines from three-dimensional point data.

2. Description of the Related Art

Recently, as a result of rapid development of a three-dimensional range scanning system, it has been common to have to process very complicated three-dimensional models obtained from the system. Also, by using such a three-dimensional range scanning system, even an actual object with a complicated shape can be measured quickly, accurately, and automatically. Three-dimensional models obtained by such measurement are used in various application fields, such as medical images, animations, games, and reverse engineering.

Various fields such as three-dimensional model visualization, geometric modeling and computer graphics, require that ridge and valley lines be extracted from a point set. This is because such extraction plays an important part in areas such as mesh reconstruction, shape analysis, and model division.

Conventionally, a model shape feature has been extracted to improve the visualization of a point set and facilitate the process of transforming a point set into a triangular mesh. Extraction of feature lines from a point set is closely related to mesh surface reconstruction. This is because such a mesh-surface reconstruction process is very sensitive to the features of a model. Therefore, extraction of feature lines from an undefined point set with unknown connection information may be used as a pre-processing step of mesh reconstruction.

Conventional techniques of directly extracting ridge and valley lines from three-dimensional point data obtained through a three-dimensional range scanning system requires a lot of time, and in addition, often has poor rendering results. Also, since extracting ridge and valley lines from three-dimensional point data requires many steps, such a technique is complicated and usually has a very high time complexity. In addition, there is a problem in that thinly extracted feature portions cannot be easily found.

SUMMARY OF THE INVENTION

Accordingly, the present invention provides a method of extracting ridge and valley lines from three-dimensional point data, which enables a basic technique of three-dimensional mesh model reconstruction to be created into library and identifies features of geometric modeling.

Also, the present invention, as a pre-processing step, contributes to creation of high-quality mesh models.

In accordance with the present invention, there is provided a method of extracting ridge and valley lines from three-dimensional point data, the method including the steps of: receiving point data input from a three-dimensional range scanning system; estimating a normal vector by analyzing localized neighborhood information of each point from the point data; creating a moving least squares (MLS) surface approximation with regard to each point of the point data; obtaining connection information on each point from the created MLS surface; measuring a curvature value and a curvature derivative regarding each point on the created MLS surface; extracting ridge and valley points by measuring zero-crossing of the obtained connection information; and creating ridge and valley lines by connecting the ridge and valley points in a curvature direction obtained from the measured curvature value and curvature derivative of said ridge and valley points.

BRIEF DESCRIPTION OF THE DRAWINGS

The patent application file contains at least one drawing executed in color. Copies of this patent application publication with color drawing(s) will be provided by the Office upon request and payment of the necessary fee.

DETAILED DESCRIPTION OF THE INVENTION

Hereinafter, exemplary embodiments of the present invention will be described in detail with reference to the accompanying drawings. For the purposes of clarity and simplicity, a detailed description of known functions and configurations incorporated herein is omitted to avoid making the subject matter of the present invention unclear.

Figure 1:
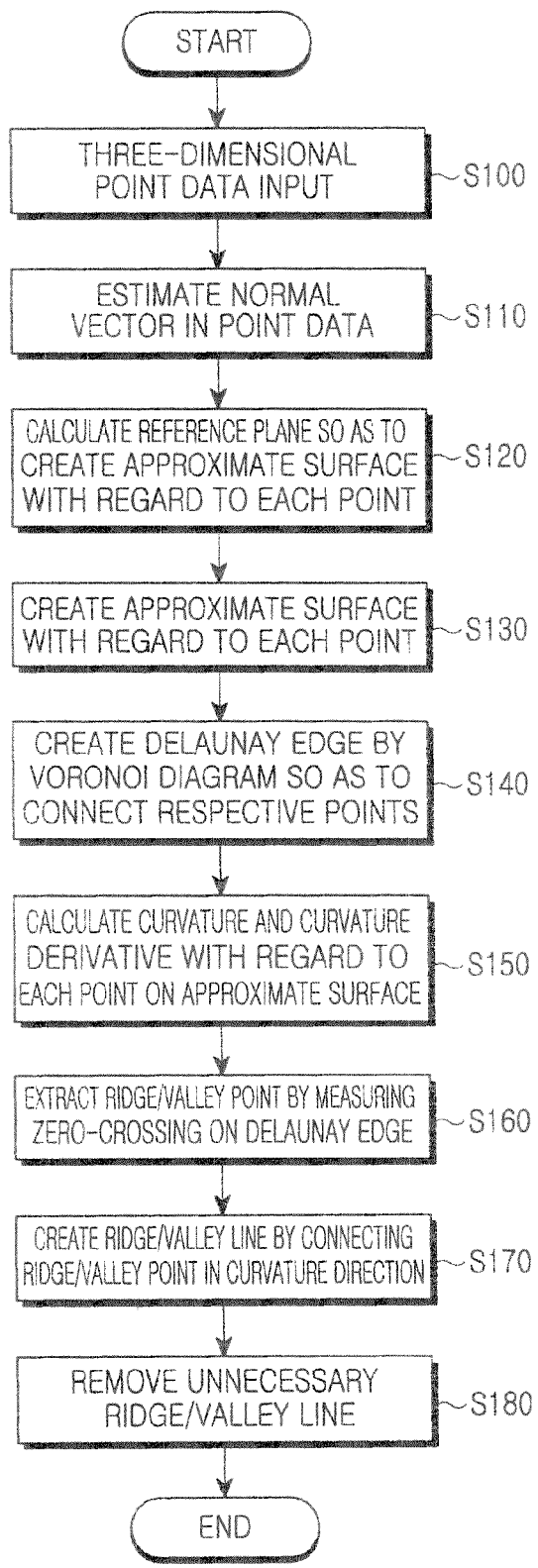
FIG. 1 illustrates a flow diagram of a method of extracting ridge and valley lines from three-dimensional point data according to an embodiment of the present invention.
Figure 2:
FIG. 2 illustrates an example of three-dimensional point data according to an embodiment of the present invention.

FIG. 1 illustrates a flow diagram of a method of extracting ridge and valley lines from three-dimensional point data according to an embodiment of the present invention; and FIG. 2 illustrates an example of three-dimensional point data according to an embodiment of the present invention.

Hereinafter, a method of extracting ridge and valley lines from three-dimensional point data according to the present invention will be described in detail with reference to the accompanying drawings.

As illustrated in FIGS. 1 and 2, in step S100, three-dimensional point data is input from a three-dimensional range scanning system.

Then, in step S110, a normal vector is estimated by analyzing localized neighborhood information of each point. So as to calculate localized surface features, the nearest adjacent neighbor within a range of k (k nearest neighbor) is used to designate a localized neighboring range of each point, in which {r0, . . . , r−1} for a point r denote k neighbors. A weighted covariance matrix is defined by the equation (1) below;

$$C := \sum_{i=0}^{k-1} \theta_i (r_i - r)(r_i - r)^T \in R^{3\times 3} \quad (1)$$

A weight is $\theta i=\theta(\|r_i-r\|)$, in which $\theta$ denotes a non-negative weight function, and a Gaussian form is defined by the equation (2) below:

$$\theta(d) = e^{-\frac{d^2}{h^2}} \quad (2)$$

wherein, as h, an estimated average value of distances of respective neighboring points is used, and an eigenvector of C corresponding to the smallest eigenvalue denotes a direction of a normal vector. The present invention improves the accuracy of the direction of a normal vector by using a minimum spanning tree. Then, a normal vector is used as a basis for moving least squares (MLS) approximation.

Figure 3:
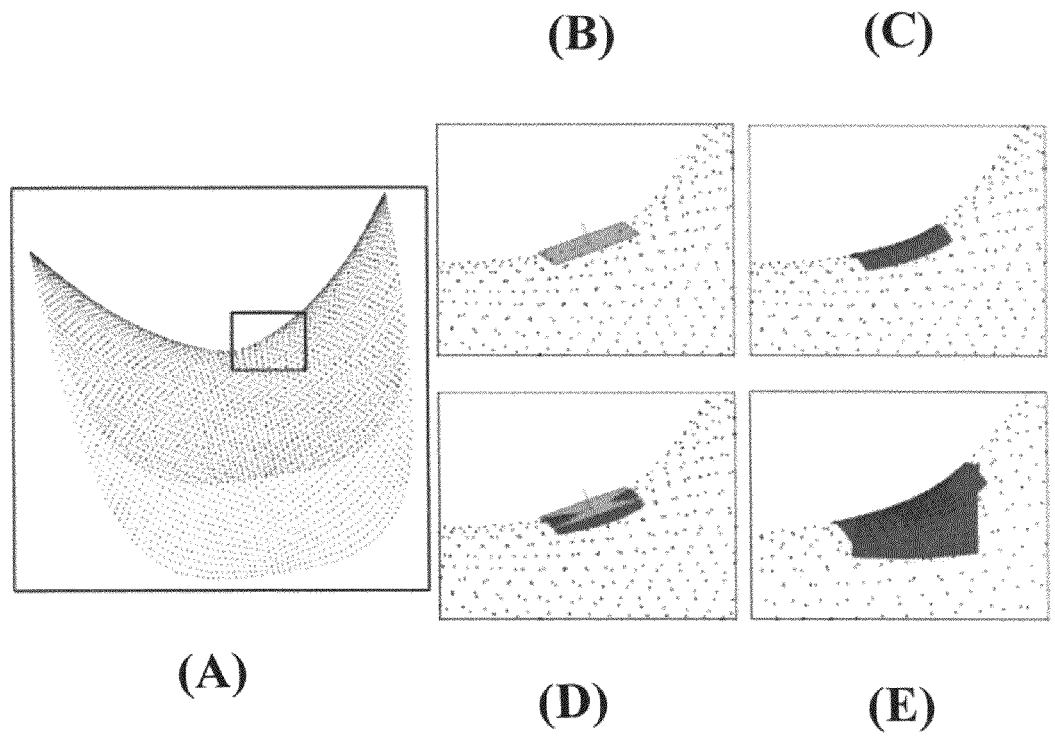
FIGS. 3A to 3E illustrate examples of a process for moving least squares (MLS) approximation in three-dimensional point data according to an embodiment of the present invention.
Figure 4:
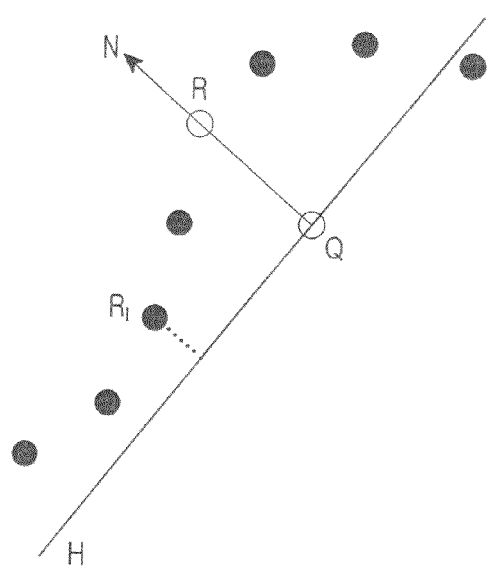
FIG. 4 illustrates an example of an approximation technique in three-dimensional point data according to an embodiment of the present invention.

FIGS. 3A to 3E illustrate examples of a process for MLS approximation from three-dimensional point data according to an embodiment of the present invention; and FIG. 4 illustrates an example of an approximation technique from three-dimensional point data according to an embodiment of the present invention.

As illustrated in FIG. 4, in step S120, as a domain for measuring an approximate surface S of FIG. 3A, a reference plane H=x|<n,x>−d=0, x∈R³ having a minimum sum of weighted squared distances from a neighboring point pi is calculated. Here, <,> denotes an inner product of two vectors, n denotes a normal vector of a plane, x denotes a three-dimensional point, and d denotes a constant value. When a point q refers to the point by projection of r onto a reference plane H, the reference plane is calculated as a plane for minimizing the expression (3) below:

$$\sum_{i\in f} (<n, r_i> -d)^2 \theta(\|r_i - q\|), \quad (3)$$

wherein a weight function is a non-negative weight function, and a Gaussian function is used in the present invention. As h, an estimated average value of distances of respective neighboring points is used. That is, when the above mentioned weight function is used, points far from q have low weights, and thus the effects on the reference plane are reduced. Therefore, a reference plane on which near points are more easily approximated can be calculated.

By substituting q=r+tn, that is, the point by projection onto a reference plane, an equation is created; and the substitution equation includes variables n and t, so that a reference plane defined by n and t is calculated, in which the equation is minimized by n and t. So as to simplify the calculation, it is assumed that t=0 (i.e. q=r). That is, referring to FIGS. 3B to 3D, a pi-approximation function p(x) with a reference plane as a domain is measured, and is defined as an approximate surface approximating a point r and its neighboring points. For such approximation, a rectangular coordinate system on a reference plane with an origin point q is created. Then, a cubic function p(x) is defined on the coordinate system; an approximate surface configured by the function has a minimum sum of weighted squared distances from pi; and an approximate surface for minimizing expression (4) is created.

$$\sum_{i=1}^{N} (p(x_i) - f_i)^2 \theta(\|r_i - q\|) \quad (4)$$

wherein, xi denotes coordinate values of the point by projection of pi onto a reference plane in a rectangular coordinate system; and fi denotes a distance between pi and the reference plane. Also, in expression (4), by calculating values for minimizing the expression on each coefficient of each term of a function p(x), it is possible to define a pi-approximate surface.

In step S130, an MLS approximation technique is used to create an approximate surface on each point of three-dimensional undefined point data. An MLS approximation technique creates a function approximating peripheral points with regard to one given point with a minimum error. Also, by projecting the given point onto the surface defined by each approximation function with regard to all point data, an object surface securing two-manifolds is defined.

MLS, in which peripheral points refer to $P_i \in R^3$ (i=1, . . . , N) with regard to one point $r \in R^3$, is a process for projecting a point r onto an approximate surface defined on a reference plane H.

For example, if a dense smooth surface is given, principal curvatures ($K_{max}$ and $K_{min}$) and principal curvature directions ($t_{max}$ and $t_{min}$) are measured with regard to a point r on the smooth surface. Here, $K_{max}$ and $K_{min}$ refer to maximum and minimum curvatures, respectively ($K_{max} > K_{min}$), and have $t_{max}$ and $t_{min}$, which coincide with the principal curvature directions.

The derivatives of $K_{max}$ and $K_{min}$ in directions $t_{max}$ and $t_{min}$ is: $e_{max} = \nabla K_{max} \cdot t_{max}$, $e_{min} = \nabla K_{min} \cdot t_{min}$. The direction cannot be measured at the umbilical point ($K_{max} = K_{min}$), which is excluded, and such points rarely occur, and thus hardly affect the result of the feature lines.

The zero-crossing with the extreme values of the principal curvatures in the principal curvature directions is defined by the equation (5) below:

$\nabla e_{max} \cdot t_{max} < 0, K_{max} > |K_{min}|$ (ridge)

$\nabla e_{max} \cdot t_{max} > 0, K_{max} < -|K_{min}|$ (valley). (5)

Also, after the principal curvatures are compared, if, on one point having the maximum curvature, the curvature derivative in the principal curvature direction is smaller than 0, the point is called a ridge.

Figure 5:
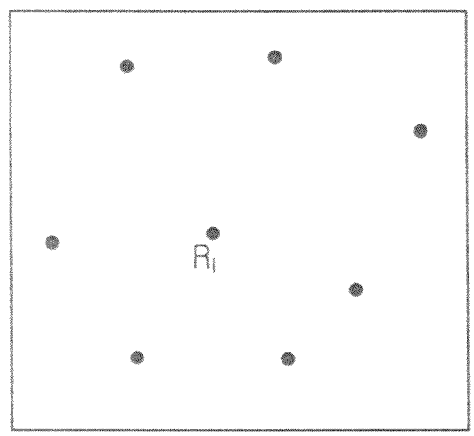
FIGS. 5A and 5B illustrate examples of an operating process of a Voronoi diagram in three-dimensional point data according to an embodiment of the present invention.
Figure 5:
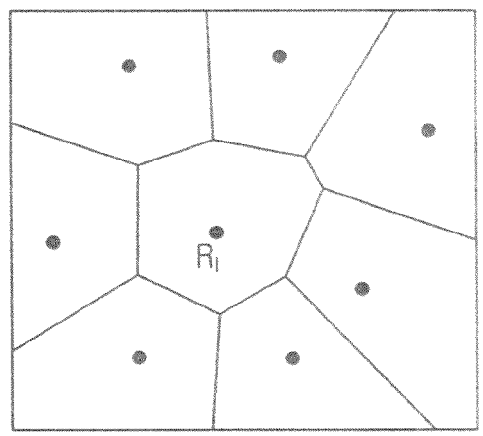

FIGS. 5A and 5B illustrate examples of an operating process of a Voronoi diagram in three-dimensional point data according to an embodiment of the present invention.

Connection between ridge points requires connection information of respective points. In step S140, a Voronoi diagram is used to obtain the connection information. Referring to FIG. 5A, respective points are projected onto a reference plane H; and the connection information (Delaunay edge) is obtained by a Voronoi neighbor calculation on H of FIG. 5B with regard to the projected points including ri.

In step S150, a curvature value and a curvature derivative are calculated for each point on the surface. A third-degree polynomial p is used to measure the curvatures ($K_{max}$ and $K_{min}$) and the curvature derivatives ($e_{max}$ and $e_{min}$) at each mesh vertex. Then, a given MLS polynomial $z=p(x_i)$ is converted into an implicit function $F=z-p(x_i)$ and calculated. As a result, the curvature value and its derivative can be measured from the implicit surface.

For one given point r, $n=(n_1,n_2,n_3)=\nabla F/|\nabla F|$ is used to measure a unit normal vector at one point r. A principal curvature K in a principal curvature direction $t=(t_1,t_2,t_3)$ can be measured as defined by the equation (6) below:

$$K = \frac{F_{ij}t^i t^j}{|\nabla F|} \quad (6)$$

wherein, $F_{ij}$ denotes a second-order partial derivative of F, and is used as Einstein summation convention. Based on eigenanalysis of $\nabla n$, the minimum value in direction $t_{min}$ and the maximum value in direction $t_{max}$ are measured. A curvature derivative e in the same direction t as a third-order partial derivative of F is defined by the equation (7) below:

$$e = \nabla K \cdot t = \frac{F_{ij}t^i t^j t^l + 3KF_{ij}t^i n^j}{|\nabla F|} \quad (7)$$

wherein, F denotes a third-order partial derivative of F. Equation (7) is used to measure $e_{max}$ and $e_{min}$ at one point r.

FIGS. 6A to 6D illustrate examples of an extracting process of ridge and valley points by measuring zero-crossing in three-dimensional point data according to an embodiment of the present invention.

Figure 6:
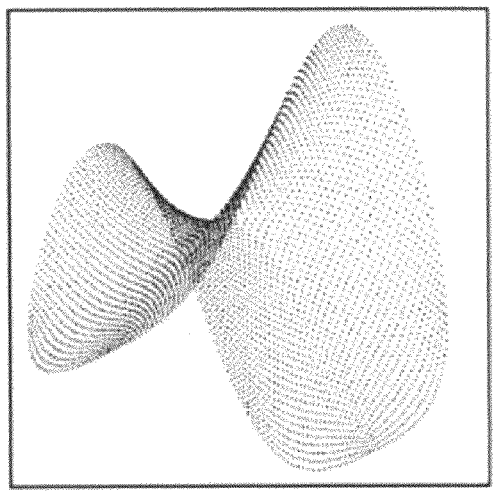
FIGS. 6A to 6D illustrate examples of an extraction process of ridge and valley points by measuring zero-crossing in three-dimensional point data according to an embodiment of the present invention.
Figure 6:
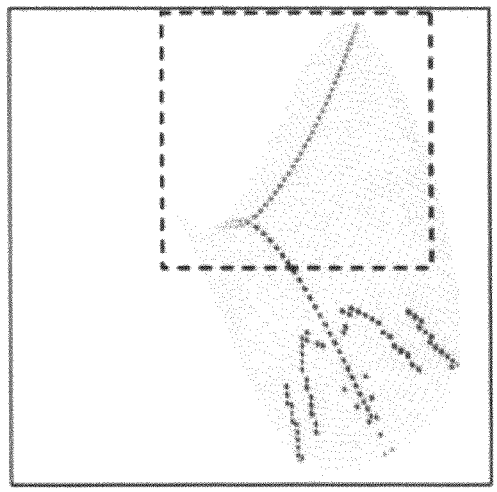
Figure 6:
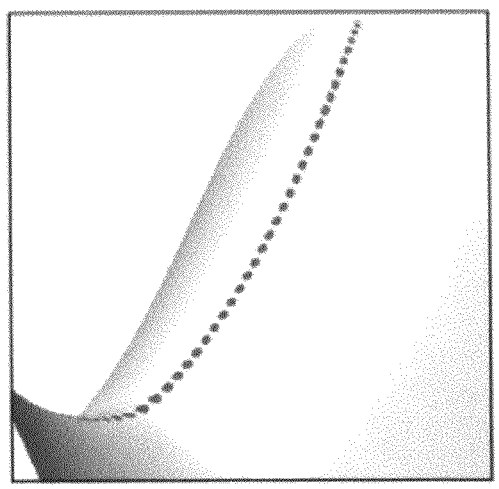
Figure 6:
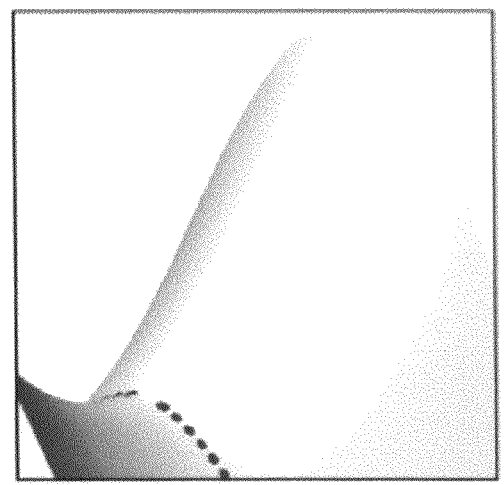

In step S160, neighborhood information on connecting respective points from points with unknown connection information as illustrated in FIG. 6A, that is, zero-crossing on Delaunay edge, is measured to extract ridge points as shown in FIG. 6B.

On given Delaunay edge $[r_i, r_{i+1}]$, the angle between $t_{max}(r_i)$ and $t_{max}(r_{i+1})$ is measured and, if it is obtuse, the signs of $t_{max}(r_{i+1})$ and $e_{max}(r_{i+1})$ are changed. In order to measure the maximum of the curvature derivatives (MCD) at each point, zero-crossing on the Delaunay edge $[r_i, r_{i+1}]$ is measured.

$$K_{max}(r_i) > |K_{min}(r_i)| \text{ and } MCD_{max}(r_i) = \quad (8)$$

$$\begin{cases} 1 & e_{max}(r_i) > 0, 0 \quad e_{min}(r_i) < 0 \\ 0 & e_{min}(r_i) = 0 \end{cases}$$

The sign of the curvature derivative is checked to confirm if zero-crossing has occurred.

$$MCD_{max}(r_i) \wedge MCD_{max}(r_{i+1}) = 1 \quad (9)$$

wherein, $\wedge$ denotes an exclusive OR operator. It can be said that, if the equation (9) is satisfied, zero-crossing exists between two points.

$$r_i = K_{max}(r_i) > K_{max}(r_{i+1})$$

$$r_{i+1} = K_{max}(r_i) < K_{max}(r_{i+1}) \quad (10)$$

In step S140, the equation (10) is used to compare the curvatures between two points and select a point having a larger value as the ridge. Here, FIGS. 6c and 6d illustrate a point-splat by enlargement of a lateral surface of FIG. 6A.

Figure 7:
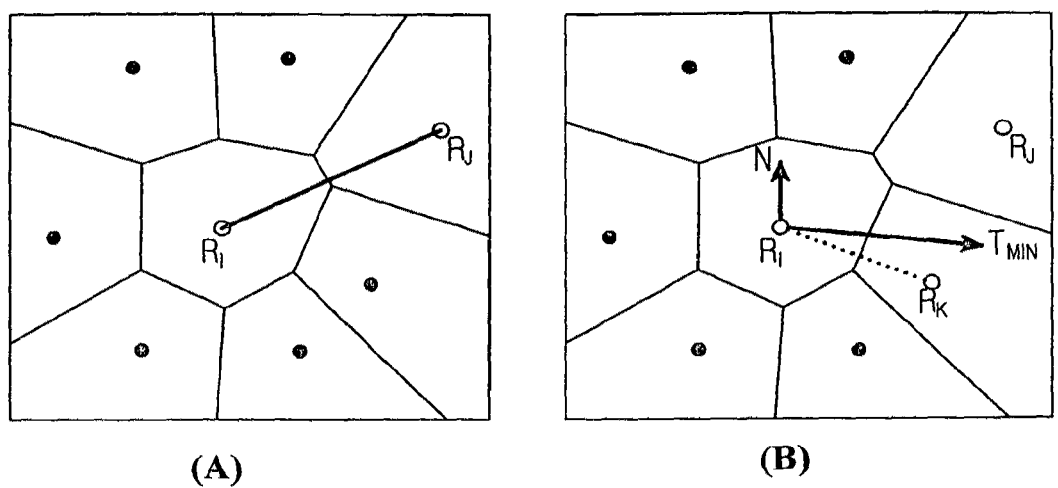
FIGS. 7A and 7B illustrate examples of a connection process of ridge points on Delaunay edge illustrated in FIGS. 5A and 5B according to an embodiment of the present invention.

FIGS. 7A and 7B illustrate examples of a connecting process of ridge points on Delaunay edge shown in FIGS. 5A and 5B, according to an embodiment of the present invention.

In step S170, respective ridge points are created into a line in the following manner: a ridge point is randomly selected as shown in FIG. 7A; and its neighbors are measured. If there is one adjacent ridge point, the randomly selected ridge point is connected to the adjacent ridge point. Also, if two or more ridge points exist as illustrated in FIG. 7B, the principal curvature direction is checked to select a ridge point positioned in the principal curvature direction. This process is repeatedly performed to create ridge lines. For convenience of description, extraction of valley lines will be omitted herein, because the valley lines are extracted in a similar manner as the ridge lines.

FIGS. 8A to 8D illustrate examples of a removal process of unnecessary ridge and valley lines from three-dimensional point data, according to an embodiment of the present invention.

Figure 8:
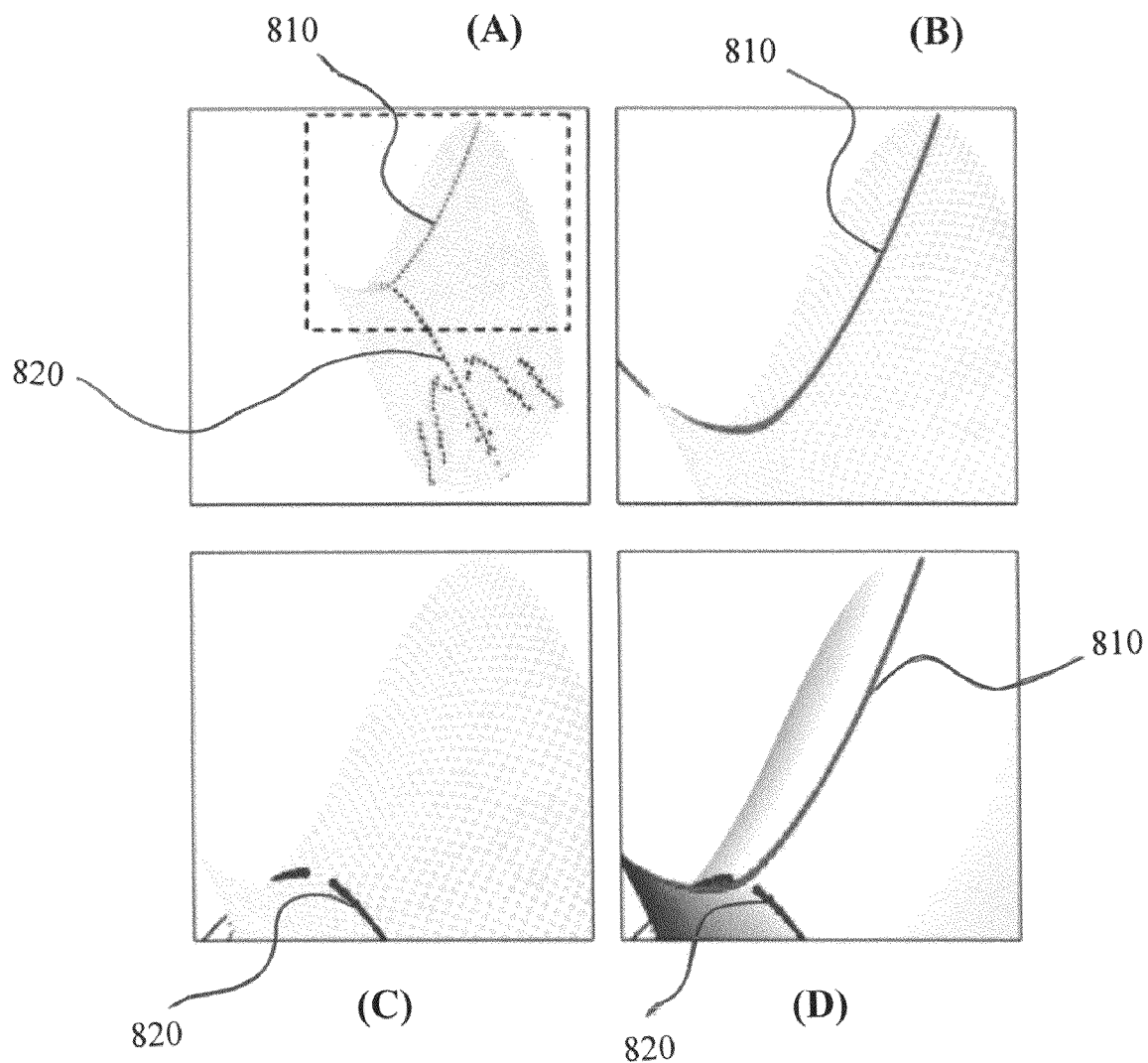
FIGS. 8A to 8D illustrate examples of a removal process of unnecessary ridge and valley lines from three-dimensional point data according to an embodiment of the present invention.

As illustrated in FIGS. 8A to 8D, in step S180, unnecessary feature lines as illustrated in FIG. 8A are removed from ridge and valley lines, that is, the feature lines. Particularly, a filtering technique is used to create a threshold as defined in the equation (11) below, based on the edge length and the curvature metric ($\sigma = K_{max}^2 + K_{min}^2$) regarding each ridge line.

$$1 \le i \le n : T = \frac{1}{n}\sum_{i=1}^{n} |r_{i+1} - r_i|^2 \cdot \frac{\delta(r_i) + \delta(r_{i+1})}{2} \quad (11)$$

Wherein, $r_i$ denotes a ridge point from a set of n points, and every line smaller than a value designated by a user is removed by T. In other words, lines shorter than a threshold or those at a point having a curvature smaller than the threshold are removed as shown in FIG. 8B.

FIGS. 9A to 9D illustrate examples of a removal process of unnecessary ridge and valley lines by a user-input threshold level from three-dimensional point data, according to an embodiment of the present invention.

Figure 9:
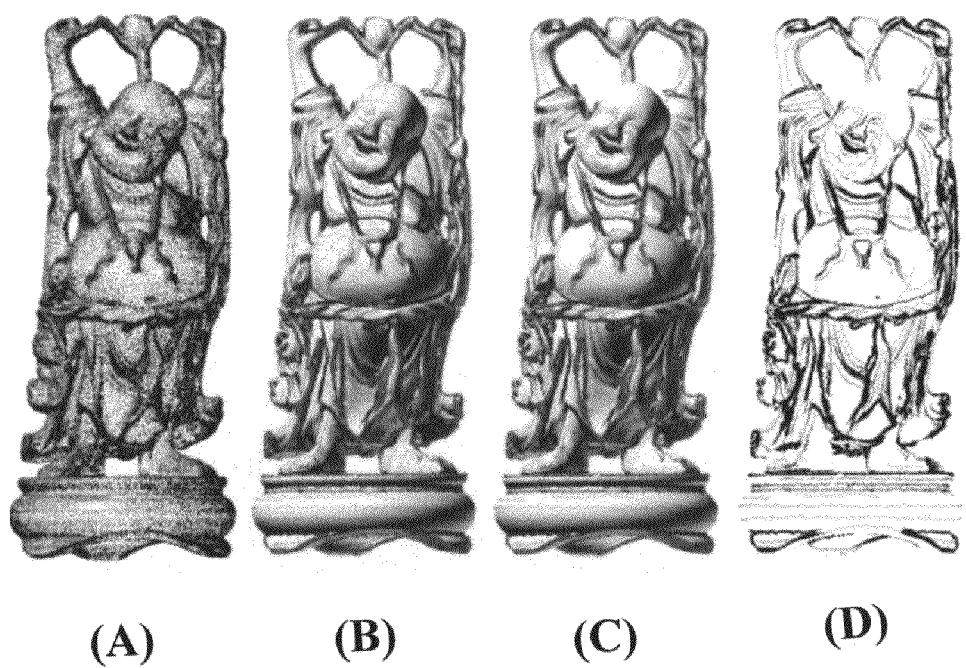
FIGS. 9A to 9d illustrate examples of a removal process of unnecessary ridge and valley lines by a user-input threshold level from three-dimensional point data according to an embodiment of the present invention.

FIG. 9A illustrates ridge and valley lines of points with unknown connection information on a Stanford Buddha model.

FIG. 9B includes many ridge and valley lines. FIG. 9C illustrates well finished ridge and valley lines after post-processing using a threshold value. FIG. 9D illustrates the result of black-rendering of ridge and valley lines so that the model can be represented similarly to non-photo realistic rendering (NPR).

Figure 10:
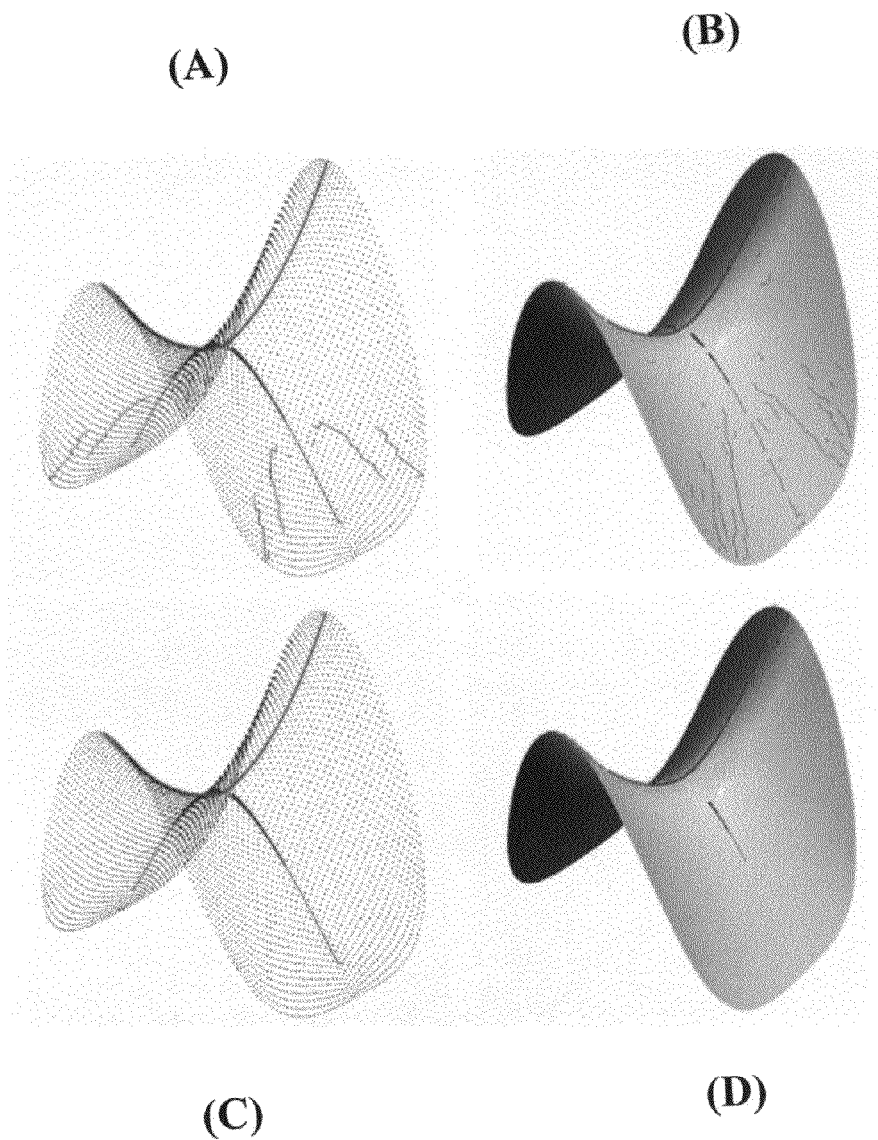
FIGS. 10A and 10D illustrate examples of reconstruction of ridge and valley lines and point-based rendering from three-dimensional point data according to an embodiment of the present invention.

FIGS. 10A and 10D illustrate examples of reconstruction of ridge and valley lines and point-based rendering from three-dimensional point data, according to an embodiment of the present invention.

FIG. 10A illustrates ridge and valley splits in three-dimensional point data, according to an embodiment of the present invention; and FIGS. 10B and 10C illustrate reconstruction of ridge and valley lines. FIG. 10D illustrates point-based rendering with ridge and valley lines. In this manner, according to the present invention, a localized curvature value and its derivative are measured with regard to one point on a surface approximated by an MLS approximation technique, so as to extract ridge and valley lines from three-dimensional point data with unknown connection information. Pre-processing steps for creating respective points into mesh data are as follows: generating neighborhood information by Delaunay tessellation; measuring zero-crossing with neighboring points using the generated neighborhood information; and extracting and connecting ridge and valley points with each other using the measured zero-crossed neighboring points. In this manner, it is possible to identify general model features.

As described above, the present invention provides a method of extracting ridge and valley lines from three-dimensional point data. The present invention configured as described above enables a basic technique of three-dimensional mesh model reconstruction to be created into library, and identifies features of geometric modeling. In addition, the present invention is, as a pre-processing step, contributes to creation of high-quality mesh models.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of extracting ridge and valley lines from three-dimensional point data, the method comprising the steps of:
   (a) receiving point data input from a three-dimensional range scanning system;
   (b) estimating a normal vector by analyzing localized neighborhood information of each point from the received point data;
   (c) creating an approximation of a moving least squares (MLS) surface of points with regard to each point of the received point data and the estimated normal vector thereof;
   (d) obtaining connection information on each point from the MLS surface of points;
   (e) measuring a curvature value and a curvature derivative regarding each point on the MLS surface of points to obtain a curvature direction;
   (f) extracting ridge and valley points by measuring zero-crossing of the connection information; and
   (g) creating ridge and valley lines by connecting the ridge and valley points in the curvature direction;
   wherein the localized curvature value and its derivative are measured with regard to one point on a surface approximated by the MLS approximation technique, so that the ridge and valley lines are extracted from the three-dimensional point data with unknown connection information;
   wherein the connecting step (g) further comprises the step of (g.3) removing unnecessary feature lines of the ridge and valley lines determined by a preset threshold; and
   wherein the removing step (g.3) further comprises the steps of:
   (g.3.1) removing ridge and valley lines using a criterion selected from the group consisting of lines shorter than the preset threshold and lines at a point having a curvature smaller than the preset threshold; and
   utilizing a filtering technique to create a threshold as defined in an equation herein below, based on the edge length and the curvature metric ($\sigma = K_{max}^2 + K_{min}^2$) regarding each ridge line:

$$1 \le i \le n: T = \frac{1}{n} \sum_{i=1}^{n} |r_{i+1} - r_i|^2 \cdot \frac{\delta(r_i) + \delta(r_{i+1})}{2} \tag{11}$$

wherein, $r_i$ denotes a ridge point from a set of n points, and every line smaller than a value designated by a user is removed by T, so that lines shorter than a threshold or those at a point having a curvature smaller than the threshold are removed.

2. The method as claimed in claim 1, wherein step (c) further comprises the step of (c.1) calculating a reference plane by using an average value of distances among received points, so as to create the MLS surface.

3. The method as claimed in claim 2, wherein the MLS surface is created by approximating peripheral points with regard to a point, with a minimum error.

4. The method as claimed in claim 1, wherein, step (d) further comprises the step of creating Delaunay edge by using a Voronoi diagram with regard to each point from the MLS surface of points.

5. The method as claimed in claim 4, wherein the extracting step (f) further comprises the step of (f.1) measuring the zero-crossing on the created Delaunay edge so as to measure a maximum curvature derivative of each point.

6. The method as claimed in claim 5, wherein step (f.1) further comprises the step (f.1.1) checking a sign of the curvature derivative.

7. The method as claimed in claim 6, wherein the connecting step (g) further comprises the steps of:
   (g.1) first performing a step of measuring neighbors of the ridge and valley points; and
   (g.2) connecting the ridge and valley lines in a principal curvature direction when at least two neighbors exist.

8. The method as claimed in claim 1, wherein the extracting step (f) further comprises the step of extracting the ridge and valley points having larger values by comparison of a curvature size of each point after the zero-crossing measurement step.

9. The method as claimed in claim 1, wherein the extracting step (f) further comprises the steps of:
   (f.2) randomly selecting a first ridge point;
   (f.3) if there is one adjacent second ridge point of the first ridge point, connecting the first ridge point to the second adjacent ridge point;
   (f.4) if two or more adjacent second ridge points exist of the first ridge point, checking a principal curvature direction and selecting a third ridge point positioned in the principal curvature direction therefrom; and
   (f.5) connecting the first ridge point to the third ridge point.

* * * * *